United States Patent [19]
Cumming et al.

[11] 3,949,840
[45] Apr. 13, 1976

[54] CAM BRAKE AUTOMATIC SLACK ADJUSTING MECHANISM

[75] Inventors: James C. Cumming, Pleasant Ridge; Alton B. Holmes, Troy, both of Mich.

[73] Assignee: Rockwell International Corporation, Pittsburgh, Pa.

[22] Filed: Mar. 3, 1975

[21] Appl. No.: 554,634

[52] U.S. Cl. .................. 188/79.5 K; 188/196 BA
[51] Int. Cl.² ...................................... F16D 65/56
[58] Field of Search.. 188/79.5 K, 79.5 GT, 196 BA

[56] References Cited
UNITED STATES PATENTS
3,507,369  4/1970  Oliver .................. 188/79.5 K X

*Primary Examiner*—Duane A. Reger

[57] ABSTRACT

A lever and automatic slack adjusting mechanism for a cam actuated brake assembly which includes a worm and shaft rotatably mounted in a bore provided to the lever, a plunger axially movable relative to the bore and having a rotary driving connection with the worm shaft, linkage means operatively connecting the plunger to the lever to effect outward movement of the plunger in response to arcuate movement of the lever in a brake applying direction and detent means carried by the lever. The detent means includes a pawl extending into toothed engagement with a helical toothed surface provided to the plunger. The pawl, following arcuate movement of the lever causing the linkage to move the plunger outwardly beyond a predetermined distance relative to the detent means during the brake applying stroke, rotates the plunger, the worm shaft and a worm gear having a rotary driving connection with a camshaft upon return movement of the plunger.

15 Claims, 5 Drawing Figures

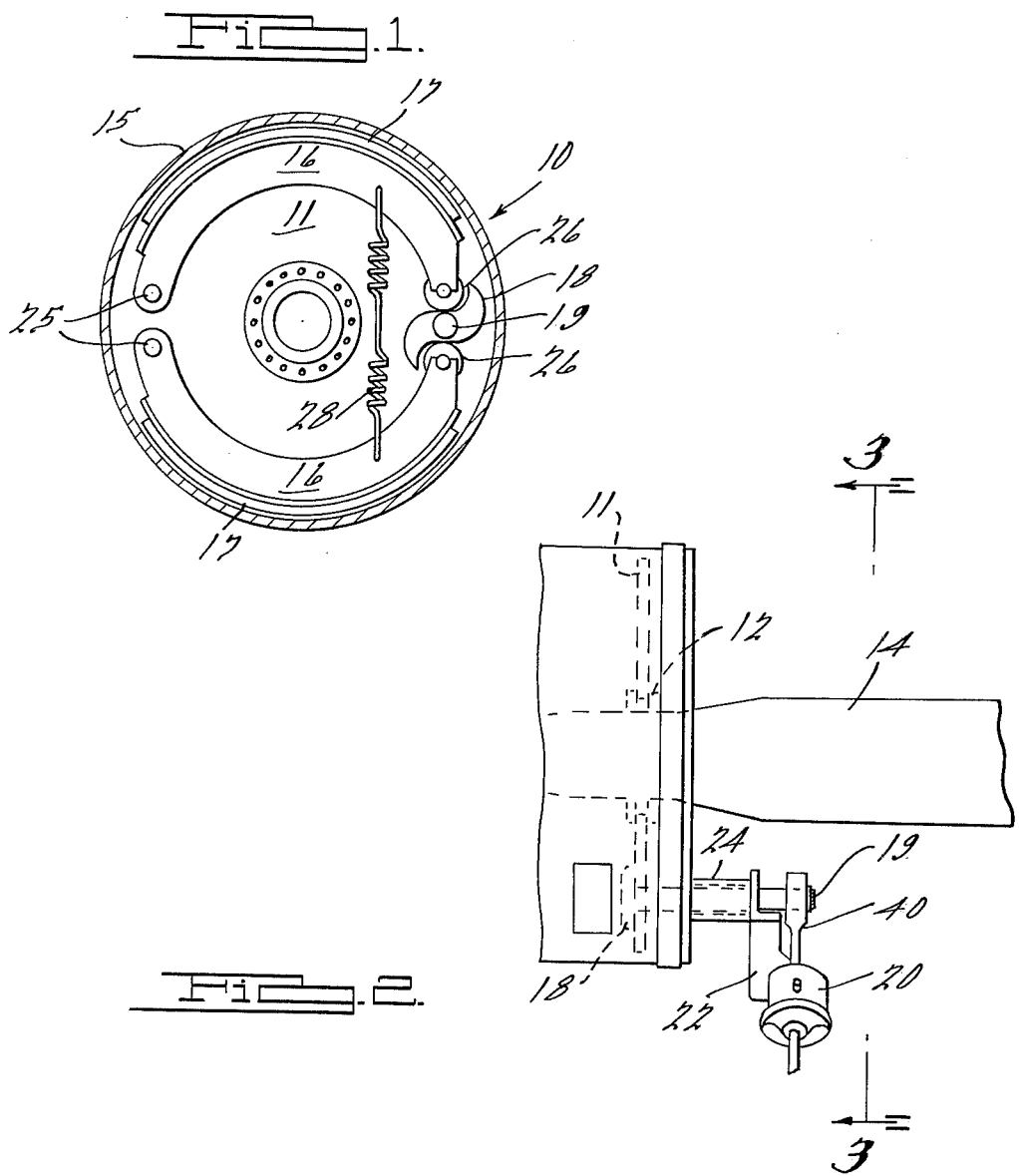
Fig. 1.
Fig. 2.
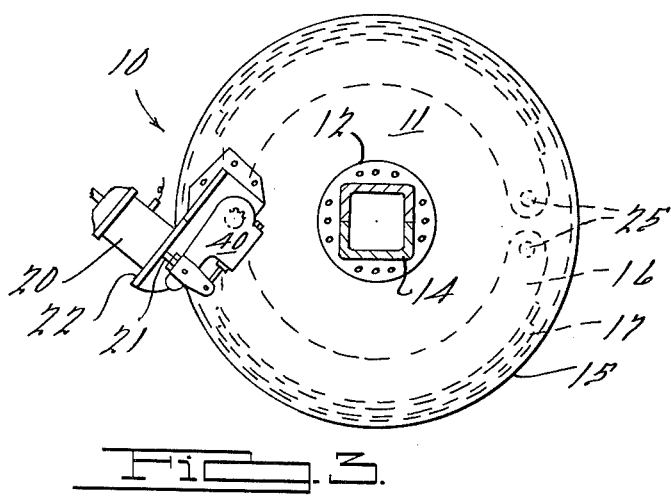
Fig. 3.

CAM BRAKE AUTOMATIC SLACK ADJUSTING MECHANISM

BACKGROUND OF THE INVENTION

This invention is directed to an automatic slack adjusting mechanism for a cam actuated brake assembly, and, more specifically, to a lever actuator and mechanism which automatically adjusts for brake shoe wear in response to movement of the lever and related linkage beyond a predetermined acceptable distance.

Various types of cam actuating levers including automatic slack adjusting mechanisms for cam actuated brake systems are known in the prior art. One such automatic adjuster which employs a torque limiting one way drive mechanism to angularly adjust a camshaft relative to an actuating lever during brake application movement of the lever is disclosed in U.S. Pat. No. 3,507,369 which issued to J. L. Oliver on Apr. 21, 1970. Another automatic adjuster employing a one way drive operative upon brake application movement of the lever is disclosed in U.S. Pat. No. 3,526,303 which issued to C. L. Lodjic et al on Sept. 1, 1970.

An automatic slack adjuster which employs a one way driving connection to effect automatic adjustment upon return or brake releasing movement of the lever is disclosed in U.S. Pat. No. Re: 26,965 which issued to Sander et al on Oct. 13, 1970. Although adjustment is effected during the brake releasing stroke, this automatic adjuster employs an external cam in the main embodiment which is open to road dirt and requires space for movement in a plane normal to the direction of movement of the actuating rod. Since the actuating rod drives the cam, the position of the adjuster relative to the actuating rod must be properly fixed at the time of installation.

Other actuating lever and automatic slack adjusting mechanisms which effect adjustment after a portion of the mechanism contacts an abutment fixed to the vehicle axle or frame are disclosed in U.S. Pats. Nos. 3,121,478 to J. L. Bostwick, issued Feb. 18, 1964; 3,351,164 to S. Svensson, issued Nov. 7, 1967 and 3,371,755 to J. W. Leeper, issued Mar. 5, 1968.

Most of the previously known automatic slack adjusting mechanism for cam actuated brake mechanisms have been subject to certain limitations. Some previously known automatic adjusting mechanisms have been unable to distinguish between the brake shoe movement required to take up the desired running slack and further movement of the cam which results from distortion of the brake assembly. An adjustment based on the total arcuate movement of the lever or cam without providing for distortion in the system could result in over adjustment and undesirable rapid wear of the lining secured to the brake shoes.

Prior art adjusting mechanisms which must be mounted in some fixed position relative to the actuator motor or a separate member such as an abutment fixed to the vehicle axle require an additional amount of skill and inspection to insure that the adjuster is properly installed. Such adjusters also occasionally require additional design considerations for proper installation on particular vehicles.

The use of other prior art slack adjusters on certain vehicles has been hampered by their size and the amount of space required to effect movement of the lever and automatic adjusting mechanism within the confines of the axle and wheel assembly environment.

Still other prior art automatic adjusters have been hampered through the use of external operating components such as cams or ratchets which are exposed to road dirt and hazards and may be adversely effected thereby.

Other automatic slack adjusters which are operative to effect adjustment during brake applying movement of the lever must accommodate stresses resulting from the combined effect of the brake actuating lever movement and the incremental movement effected by the automatic adjusting mechanism. Mechanisms of this type may fail to make an adjustment when it is desirable. The lever movement driving through the adjusting mechanism may also shorten the effective life of the automatic adjusting mechanism.

SUMMARY OF THE INVENTION

The present invention avoids certain of the foregoing problems of the prior art by providing an automatic slack adjusting mechanism which is substantially entirely contained within the lever and therefore not exposed to road dirt or other hazardous materials and which is compact and may be readily accommodated within the space available in most vehicles. The adjusting mechanism of the present invention is responsive to over travel of the lever on the brake application stroke to effect automatic slack adjustment upon return movement of the lever and therefore does not compound the braking stress applied to the lever with that induced by the automatic adjusting mechanism. The present invention also includes lost motion means in the linkage to prevent over adjustment by accommodating the normal running clearance provided to the system as well as arcuate movement of the lever which results from distortion in the brake system. The adjusting mechanism of the present invention also does not rely on the use of a friction clutch which is subject to wear.

The present invention is an improved lever and automatic slack adjusting mechanism for a cam actuated brake system which includes a shaft rotatably mounted in a bore provided to the lever, means driven by the shaft to effect angular movement of a camshaft, a plunger slidably received in the bore and having an axially movable rotary driving connection with the shaft. The plunger is connected to the lever after predetermined movement of the lever by a linkage assembly including an element movable outward relative to the bore in response to movement of the lever in a brake applying direction and inward upon return movement of the lever. Detent means are provided in the lever and resiliently biased into engagement with the plunger. Automatic adjustment is effected following movement of the lever causing the plunger to move outward beyond a predetermined distance relative to the detent means. The detent means rotates the plunger and shaft a predetermined arcuate distance upon return movement of the plunger to rotate the camshaft and take up slack in the brake system.

BRIEF DESCRIPTION OF THE DRAWINGS

In the drawings wherein like reference numerals refer to like parts:

FIG. 1 is a side elevation partly in section of a cam actuated vehicle brake assembly;

FIG. 2 is a top plan view of the vehicle brake assembly of FIG. 1;

FIG. 3 is a view taken on the line 3—3 of FIG. 2;

DESCRIPTION OF THE INVENTION

Figure 4:
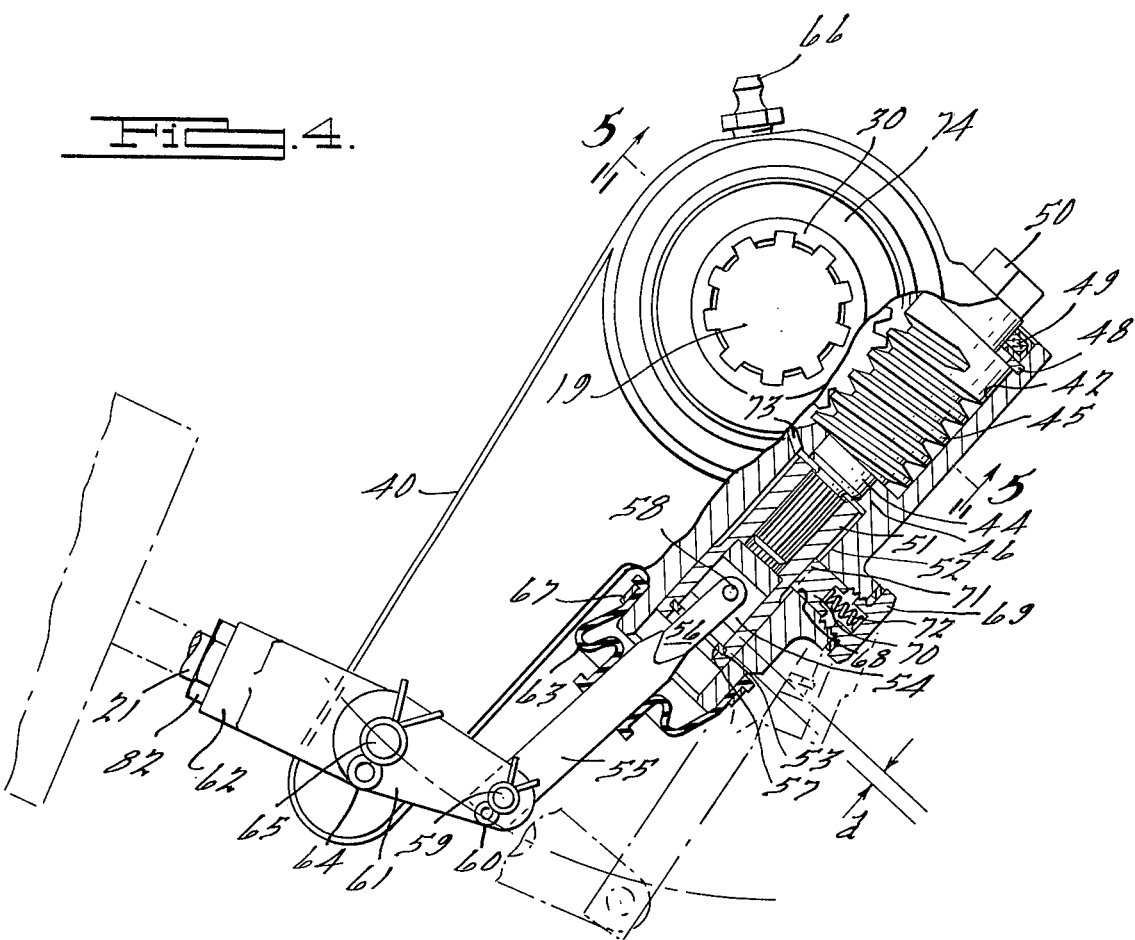
FIG. 4 is an enlarged side elevation view of the lever and automatic slack adjusting mechanism of the present invention with part of the mechanism housing broken away for clarity of illustration.

In FIGS. 1–3 the present invention is shown in combination with a cam actuated brake assembly 10 supported by a spider 11 secured to a flange 12 which in turn is welded to a vehicle axle 14. The brake assembly 10 is comprised of a brake drum 15, a pair of brake shoes 16, a brake actuating cam 18 non-rotatably secured to a camshaft 19, an actuating motor 20 having a reciprocating brake actuating rod 21 and a lever 40 operatively interconnecting the brake actuating rod 21 and the camshaft 19. The brake shoes 16 are each respectively provided with asbestos type linings 17.

The actuating motor 20 is supported by an angle bracket 22 secured as by welding to one end of a tube 24. The tube 24 is welded at its other end to the spider 11 and encloses a length of the camshaft 19.

The brake shoes 16 are each respectively mounted for pivotal movement about a pin 25 fixed to the spider 11. The opposite ends of the brake shoes 16 are provided with roller followers 26 biased into engagement with an S-type brake actuating cam 16 by a spring 28.

The brake assembly 10 as thus far described is well known in the art and is normally operated by depressing the vehicle brake pedal which supplies fluid pressure, usually air, to the actuating motor 20. The fluid pressure operating on a piston or diaphragm in the motor 20 forces the actuating rod 21 outwardly of the motor housing thereby rotating the lever 40 and camshaft 19 counterclockwise as viewed in FIG. 3 about the axis of the camshaft 19. The camshaft 19 rotates the brake actuating cam 18 in a clockwise direction as viewed in FIG. 1. Rotary movement of the cam 18 as transmitted through the roller followers 26 forces the brake shoes 16 to pivot about the pins 25 until the brake shoe lining 17 is pressed into frictional contact with the brake drum 15. When the brakes are released fluid pressure is exhausted from the actuator motor 20 and means internally of the motor 20, usually a spring, return the actuating rod 21 and lever 40 to their normally retracted positions as shown in FIG. 3. When the fluid pressure is exhausted from the actuating motor 20, the brake shoes 16 and linings 17 are returned by spring 28 to their normal running position as shown in FIG. 1 where a clearance space is provided between the linings 17 and the brake drum 15. The spring 28 acting through the brake shoes 16 and roller followers 26 also assists in returning the cam 18, camshaft 19 and lever 40 to their normal non-braking position as shown in FIGS. 1–3.

The invention will now be described with particular reference to FIGS. 4 and 5 where the lever 40 and the automatic slack adjusting mechanism are shown in detail.

The lever 40 is an elongated housing having an opening 41 adjacent one end and a bore 42 extending partially along the length of the housing. A shaft 44 having a worm 45 formed integral therewith is rotatably mounted in the bore between a shoulder 46 and snap ring 48. A seal 49 is provided axially outward of the snap ring 48 and the internal surfaces of the seal 49 and shoulder 46 provide radial bearing surfaces for the shaft 44. The end of the shaft 44 axially outward of the worm seal 49 is formed as a square driving head 50 to provide an externally accessible means for manually rotating the shaft. The opposite end of the shaft 44 extends beyond the shoulder 46 and has a longitudinally movable rotary driving splined connection internally of a plunger 51 provided in the form of a hollow cylinder. The exterior surface portion of the plunger concentric with the interior splined connection to the shaft 44 is provided with a plurality of circumferentially spaced, axially extending helical teeth 52.

A piston 54 is freely slidably disposed within the interior of plunger 51. The hollow interior of the plunger 51 is provided with a circumferentially extending groove 53 axially outward of the piston 54. A retaining ring 57 is fitted to the groove 53 to prevent the piston 54 from being withdrawn from the plunger and to provide a piston engaging abutment for moving the plunger axially outward of the bore 42 in response to axially outward movement of the piston 54 beyond a distance d, as shown in FIG. 4.

The piston 54 is diametrically slotted to receive the flat end 56 of a rod 55 pivotally connected to the piston 54 by a pin 58. The opposite end of the rod 55 is pivotally connected by means of a pin 59 and cotter key 60 to the bifurcated end of a clevis 61. The opposite end of the clevis 61 is provided with an internally threaded bore 62 which receives the threaded end of brake actuating rod 21. The end of the lever 40 opposite the opening 41 extends between the legs of the bifurcated end of clevis 61 where it is pivotally connected intermediate the ends of the clevis by means of a cotter key 64 and pin 65 passing through an appropriate sized hole in the lever.

The end of the bore 42 receiving the rod 55 is closed by a flexible boot seal 63 elastically snugly fitted about the rod 55 and secured by a retaining clamp 67 to a boss-like projection of the lever 40.

The lever 40 is also provided with a bore 68 which intersects the bore 42 opposite the helical toothed portion 52 of plunger 51. The outer end of the bore 68 is internally threaded to receive a hollow cap screw 69. A pawl 70 having buttressed teeth 71 formed at one end thereof is slidably received within the bore 68. A spring 72 is seated against the hollow interior of cap screw 69 and biases the buttressed teeth 71 of pawl 70 into toothed engagement with the helical teeth 52 provided to plunger 51.

A worm gear 74 having a splined internal opening 75 is mounted for rotation in the lever opening 41. As best shown in FIG. 5 a pair of circumferentially extending grooves 76, 78 are provided adjacent each axial end of the worm gear 74. The grooves 76 are each fitted with an annular sealing ring 79. A thrust washer 80 is provided axially outward of each annular seal 79 and a pair of retaining rings 81 seated in the grooves 78 and bearing against the axially outer surface of the thrust washers 80 prevent axial movement of the worm gear assembly while permitting the worm gear 74 to rotate within the opening 41. A fitting 66 is provided to introduce lubricant between the worm gear 74 and the opening 41, and by means of passage 73, to the bore 42.

As best shown in FIG. 4, the teeth of the worm 45 drivingly engage the teeth of the worm gear 74. Rotary movement of the shaft 44 and the worm 45 in the bore 42 will rotate the worm gear 74 and the camshaft 19 relative to the lever 40. Since the worm 45 is fixed by shoulder 46 and snap ring 48 against axial movement in the bore 42, the worm 45 functions as a stationary part of the lever 40 and rotates the worm gear 74 and camshaft 19 when the lever 40 is pivoted about the axis of the camshaft 19 by the actuating rod 21 and clevis 61.

The lever 40 is installed to a brake assembly in the following manner. The clevis 61 is threaded to the actuating rod 21 and secured in place by a jam nut 82. The lever 40 is then axially positioned over the splined end 29 of camshaft 19 and secured inplace by a retaining ring 30 fitted to a groove 31 provided adjacent the end 29 of camshaft 19. A spacer or plurality of washers 32 may be provided between the inboard surface of the lever 40 and the angle bracket 22 to align the lever 40 with the actuating rod 21. The lever 40 is then rotated about the camshaft 19 by manually rotating the square driving head 50 of shaft 44 until the openings in lever 40 and clevis 61 are properly aligned to receive pin 65. After the lever 40 and clevis 61 have been pivotally connected the rod 55 is connected by means of the pin 59 and cotter key 60 to the clevis 61. The assembly may then be adjusted either manually by rotating the square driving head, or automatically by applying and releasing the brakes until the desired running clearance is established between the brake shoe linings 17 and the brake drum 15.

Automatic Slack Adjusting Mechanism

Automatic adjustment is effected by operation of the shaft 44, worm 45, plunger 51, piston 54 and the linkage 55, 61 pivotally connected the piston 54 to the lever 40. Axial movement of the actuating rod 21 in a brake applying direction moves the clevis 61 and lever 40 counterclockwise, as viewed in FIGS. 3 and 4, about the axis of the camshaft 19. During such movement the clevis 61 traverses an arcuate path as shown by the chain line in FIG. 4 and, pivoting about the pin 65, moves the rod 55 and piston 54 outward relative to the plunger 51 and bore 42 as shown by phantom lines. The spacing or distance d provided between the piston 54 and retaining ring 57 permits the piston 54 to move freely within that axial length of the plunger. The distance d is calculated relative to the arcuate movement of the camshaft 19 which is required to take up the normal running clearance desired between the brake lining 17 and the brake drum 15 and a substantial portion of that arcuate movement which produces distortion in the brake assembly. The remaining arcuate movement producing distortion in the assembly and the lining wear allowable before automatic adjustment is to be effected are accommodated by the axial length of each of the buttressed teeth 71. Thus as long as the brake linings 17 have not experienced appreciable wear, the piston 54 will abut the ring 57 and move the plunger 51 outward relative to the bore 42 and pawl teeth 71. After the acceptable amount of lining wear, the plunger 51 moving relative to the spring biased pawl 70 will cause the pawl 70 to retract and engage an adjacent set of helical teeth 52 on the plunger 51. After the brakes are released and the lever 40 and plunger 51 are returning to the normal position as shown in FIG. 4, the buttressed teeth 71 of the pawl 70 will rotate the plunger 51, shaft 44 and worm 45 to effect a predetermined arcuate movement of the worm gear 74 and camshaft 19. This will effect a slight rotary adjustment of the S-type actuating cam 18 as shown in FIG. 1 to pivot the brake shoes 16 outwardly until the desired running clearance is again established between the linings 17 and brake drum 15.

Figure 5:
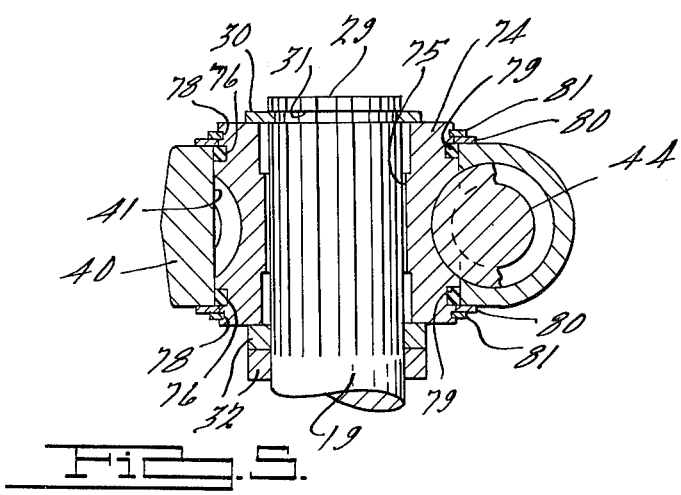
FIG. 5 is a sectional view taken on the line 5—5 of FIG. 4.

In one embodiment of the invention as shown in FIGS. 4 and 5, the distance d is preferably about 0.225 inch and the axial length of each of the buttress teeth 71 is about 0.119 inch. This provides a predetermined distance or total axial movement of the piston 54 and plunger 51 of about 0.344 inch before automatic adjustment is effected.

Although the rod 55, piston 54 and plunger 51 are moved by the clevis during every brake applying movement of the actuating rod, the brake applying forces are transmitted through the lever independently of the automatic slack adjusting mechanism and automatic adjustment is effected upon return or brake releasing movement of the lever.

The foregoing cam actuating lever and automatic slack adjusting mechanism has been described in combination with an S-type oscillating rotary cam actuated drum type brake system. The actuating lever and automatic adjusting mechanism is not limited to use in a drum type brake system but may be used equally well in combination with other cam actuated brake systems employing an actuating lever, for example, a cam actuated disc type brake system.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

What is claimed and desired to be secured by Letters Patent is:

1. A lever actuator and automatic slack adjusting mechanism for a rotary oscillating cam actuated brake assembly comprising:
    an elongated housing having an opening therethrough and a bore,
    a worm gear rotatably mounted in said opening,
    a shaft mounted for rotation in said bore and having a worm non-rotatably secured thereto, said worm drivingly engaging said gear,
    a plunger assembly including a plunger slidably mounted in said bore, said plunger having an axially movable rotary driving connection with said shaft in said bore, detent means in said housing, said detent means being axially fixed relative to said bore and resiliently biased into engagement with said plunger, and
    link means pivotally connecting one end of said plunger assembly to said housing whereby pivotal movement of said link means relative to said housing will move said plunger assembly relative to said detent means and said detent means will rotate said plunger, said worm and said worm gear upon return movement of said plunger assembly following outward movement of said assembly beyond a predetermined distance relative to said detent means.

2. The lever actuator and automatic slack adjusting mechanism defined in claim 1 wherein said plunger assembly comprises a rod axially movable relative to said plunger in said bore and means adapted to move said plunger outwardly relative to said bore after predetermined outward movement of said rod.

3. The lever actuator and automatic slack adjusting mechanism defined by claim 2 wherein said plunger is a hollow cylinder, said one end of said rod includes a member axially movable internally of said cylinder and said cylinder includes abutment means engageable by said member after said predetermined outward movement of said rod.

4. The lever actuator and automatic slack adjusting mechanism defined by claim 3 wherein said member is a piston pivotally connected to said rod and said abutment means comprises a ring mounted in a groove provided internally of said cylinder.

5. The lever actuator and automatic slack adjusting mechanism defined by claim 1 wherein said plunger is a cylinder having a splined connection with said shaft and a helical toothed surface portion and said detent means includes a spring biased pawl extending into toothed engagement with said helical toothed surface portion.

6. The lever actuator and automatic slack adjusting mechanism defined by claim 1 wherein said link means is connected at one end to said plunger assembly adapted at its opposite end for connection to an actuating motor and pivotally connected intermediate its ends to said housing.

7. A lever actuator and automatic slack adjusting mechanism for a rotary oscillating cam actuated brake assembly comprising:
a housing defining a lever,
a bore in said housing,
a shaft mounted for rotation in said bore and including means for rotating a cam shaft,
a plunger mounted for axial movement in said bore and having a splined connection with said shaft, said plunger having a helical toothed surface portion,
detent means in said housing including a spring biased pawl extending into toothed engagement with said helical toothed surface of said plunger, and means connecting said plunger to said housing including a rod having one end axially movable relative to said bore and a lost motion connection adapted to move said plunger outward after predetermined outward movement of said rod relative to said bore and a link pivotally connecting the other end of said rod to said housing whereby pivotal movement of said link relative to said housing will move said rod relative to said bore and said pawl will rotate said plunger and said shaft means for rotating a camshaft a predetermined arcuate distance upon return movement of said plunger following outward movement of said rod and plunger beyond a predetermined distance relative to said pawl.

8. An automatic slack adjusting mechanism for a brake assembly including a pair of brake shoes mounted for pivotal movement effected by a rotary cam disposed between opposed ends of said brake shoes, said cam being mounted for rotation with a camshaft and said mechanism interconnecting an actuating rod with said camshaft, comprising:
a housing defining a lever,
a bore in said housing,
a shaft mounted for rotation in said bore,
means on said shaft operatively drivingly connected to said camshaft,
a plunger slidably mounted in said bore and having an axially movable rotary driving connection with said shaft,
linkage means connecting said plunger to said lever, said linkage means including an element movable outward relative to said bore in response to movement of said lever in a brake applying direction and inward upon return movement of said lever,
detent means in said housing, said detent means being axially fixed relative to said bore and resiliently biased into engagement with said plunger whereby said detent means will rotate said plunger, said shaft and said means operatively drivingly connected to said camshaft a predetermined arcuate distance upon return movement of said plunger following outward movement of said plunger beyond a predetermined distance relative to said detent means.

9. The automatic slack adjusting mechanism defined by claim 8 wherein said plunger is a hollow cylinder slidably mounted in said bore, said element is a rod pivotally connected to said housing by a link, and said rod is connected to said plunger by lost motion means permitting limited brake applying movement of said lever before moving said plunger.

10. The automatic slack adjusting mechanism defined by claim 9 wherein one end of said rod is axially movable internally of said cylinder and said cylinder includes abutment means engageable by said end of said rod after said lever moves said predetermined distance.

11. The automatic slack adjusting mechanism defined by claim 10 wherein a piston is pivotally mounted to said end of said rod and said abutment means is mounted in a groove provided internally of said cylinder.

12. the automatic slack adjusting mechanism defined by claim 8 wherein said linkage means includes an elongated member pivotally connected intermediate its ends to said lever, said element is a rod pivotally connected at one end by lost motion means to said plunger and at its other end to one end of said member, and the other end of said member is drivingly connected to a brake actuating rod.

13. The automatic slack adjusting mechanism defined by claim 8 wherein said plunger is a cylinder slidably mounted in said bore, said cylinder is splined to said shaft, and said means operatively drivingly connected to said camshaft includes a worm non-rotatably secured to said shaft.

14. The automatic slack adjusting mechanism defined by claim 8 wherein said plunger is a cylinder slidably mounted in said bore and includes a helical toothed surface portion and said detent means includes a spring biased pawl extending into toothed engagement with said helical toothed surface portion.

15. The lever actuator and automatic slack adjusting mechanism defined by claim 1 wherein said worm gear extends beyond oppositely disposed surfaces of said housing and includes a circumferentially extending groove adjacent each oppositely disposed end thereof, said grooves are spaced from said oppositely disposed housing surfaces, said worm gear is mounted to said housing by retaining means disposed in each of said grooves and a thrust washer disposed between each of said retaining means and said oppositely disposed housing surfaces to prevent axial movement of said worm gear while permitting said worm gear to rotate within said housing opening.

* * * * *